(12) United States Patent
Lim et al.

(10) Patent No.: US 11,540,280 B2
(45) Date of Patent: Dec. 27, 2022

(54) METHOD FOR TRANSMITTING AND RECEIVING SIGNAL BY TERMINAL SUPPORTING DUAL CONNECTIVITY BETWEEN E-UTRA AND NR AND TERMINAL FOR PERFORMING SAME METHOD

(71) Applicant: LG ELECTRONICS INC., Seoul (KR)

(72) Inventors: Suhwan Lim, Seoul (KR); Sangwook Lee, Seoul (KR); Jaehyuk Jang, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 17/040,958

(22) PCT Filed: Apr. 23, 2019

(86) PCT No.: PCT/KR2019/004880
§ 371 (c)(1),
(2) Date: Sep. 23, 2020

(87) PCT Pub. No.: WO2019/216577
PCT Pub. Date: Nov. 14, 2019

(65) Prior Publication Data
US 2021/0029698 A1    Jan. 28, 2021

(30) Foreign Application Priority Data
May 11, 2018 (KR) ........................ 10-2018-0054477

(51) Int. Cl.
*H04W 72/04* (2009.01)
*H04W 76/15* (2018.01)

(52) U.S. Cl.
CPC ....... *H04W 72/0453* (2013.01); *H04W 76/15* (2018.02)

(58) Field of Classification Search
None
See application file for complete search history.

(56) References Cited

U.S. PATENT DOCUMENTS

| 2014/0241317 A1 | 8/2014 | Jamadagni et al. |
| 2015/0117183 A1 | 4/2015 | Heo et al. |
| (Continued) | | |

OTHER PUBLICATIONS

NTT Docomo, Inc. (TP for TR 37.863-02-01 3DL/2UL DC_1A-3A-n79A-R4-1710978) (Year: 2017).*

(Continued)

*Primary Examiner* — The Hy Nguyen
(74) *Attorney, Agent, or Firm* — Lee, Hong, Degerman, Kang & Waimey PC

(57) ABSTRACT

One disclosure of the present specification provides a terminal for transmitting and receiving a signal, the terminal supporting dual connectivity between E-UTRA and NR. The terminal comprises: a transceiver for transmitting an uplink signal and receiving a downlink signal by using the dual connectivity; and a processor for controlling the transceiver, wherein the transceiver is configured to use two of E-UTRA operating bands 1, 3, 18, 21, 28, 41, and 42 and NR operating band n79, and when an uplink center frequency of a first operating band among the E-UTRA operating bands and the NR operating band n79 is a first value and a downlink center frequency of the first operating band is a second value, an MSD is preset, and on the basis of a dual uplink operation, the MSD may be applied to reference sensitivity used for receiving the downlink signal.

2 Claims, 15 Drawing Sheets

(56) References Cited

U.S. PATENT DOCUMENTS

| | | | |
|---|---|---|---|
| 2019/0081657 A1* | 3/2019 | Zeng | H04B 1/711 |
| 2019/0273314 A1* | 9/2019 | Wloczysiak | H04B 1/109 |
| 2020/0119889 A1* | 4/2020 | Jiang | H04B 1/525 |
| 2020/0359398 A1* | 11/2020 | Takahashi | H04W 16/32 |

OTHER PUBLICATIONS

NTT Docomo, Inc. (TP for TR 37.863-01-01 MSD for 2DL/2UL DC combinations including Band n77, n78 and n79-R4-1711837) (Year: 2017).*

NTT Docomo, Inc. (TP for TR 37.863-02-01 MSD for DC including Band n77, n78 and n79-R4-1712822) (Year: 2017).*

PCT International Application No. PCT/KR2019/004880, International Search Report dated Jul. 26, 2019, 2 pages.

NTT Docomo, Inc., "MSD for 3DL/2UL DC related to B28," 3GPP TSG-RAN WG4 Meeting #86-bis, R4-1804366, Melbourne, Australia, Apr. 16-20, 2018, 5 pages.

SoftBank Corp., "TP on TR 37.863-01-01 for DC_41A-n79A: missing parts and corrections," 3GPP TSG-RAN WG4 Meeting #86bis, R4-1803746, Melbourne, Australia, Apr. 16-20, 2018, 9 pages.

KDDI Corporation, "TP for TR 37.863-02-01 for DC combinations of DC_18A-28A-n79A," 3GPP TSG-RAN WG4 AH Meeting, R4-1804904, Melbourne, Australia, Apr. 16-20, 2018, 4 pages.

* cited by examiner

METHOD FOR TRANSMITTING AND RECEIVING SIGNAL BY TERMINAL SUPPORTING DUAL CONNECTIVITY BETWEEN E-UTRA AND NR AND TERMINAL FOR PERFORMING SAME METHOD

CROSS-REFERENCE TO RELATED APPLICATIONS

This application is the National Stage filing under 35 U.S.C. 371 of International Application No. PCT/KR2019/004880, filed on Apr. 23, 2019, which claims the benefit of earlier filing date and right of priority to Korean Application No. 10-2018-0054477, filed on May 11, 2018, the contents of which are all hereby incorporated by reference herein in their entirety.

BACKGROUND OF THE DISCLOSURE

Field of the disclosure

The present disclosure relates to a next-generation mobile communication.

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband. It seems difficult for this ultra-wideband high-speed service to be accommodated by the core network designed for legacy LTE/LTE-A. Therefore, in the so-called fifth generation mobile communication, a redesign of the core network is urgently required.

Meanwhile, in the 5th generation mobile communication, a scheme (EN-DC) of dually connecting LTE and NR is underway to ensure communication stability. However, in a state in which a downlink carrier using LTE and a downlink carrier using NR are aggregated, transmission of an uplink signal may cause a harmonic component and an intermodulation distortion (IMD) component to affect a downlink band of a terminal itself.

SUMMARY

Accordingly, in an effort to solve the aforementioned problem, one disclosure of the present specification provides a method for transmitting and receiving a signal by a user equipment (UE) supporting dual-connectivity between evolved universal terrestrial radio access (E-UTRA) and new radio (NR). The method may comprise: transmitting an uplink signal using dual-connectivity between the E-UTRA and the NR; and receiving a downlink signal using the dual-connectivity, wherein, when the UE is configured to use two of E-UTRA operating bands 1, 3, 18, 21, 28, 41, and 42 and an NR operating band n79, an uplink center frequency of a first operating band, among the E-UTRA operating bands and the NR operating band n79, is a first value, and a downlink center frequency of the first operating band is a second value, MSD (maximum sensitivity degradation) may be preset and the MSD may be applied to reference sensitivity used for reception of the downlink signal, based on a dual uplink operation, and, wherein, when the UE is configured to use the E-UTRA operating bands 1 and 41, the first operating band is the E-UTRA operating band 41, the first value is 2530 MHz, and the second value is 2530 MHz, the MSD value may be 29.4 dB.

Accordingly, in an effort to solve the aforementioned problem, a disclosure of the present disclosure provides a user equipment (UE) supporting dual connectivity with Evolved Universal Terrestrial Radio Access (E-UTRA) and New Radio (NR). The UE may comprise: a transceiver configured to transmit uplink signal and receive downlink signal by using the dual connectivity; and a processor configured to control the transceiver. The transceiver may be configured to use two of E-UTRA operating bands 1, 3, 18, 21, 28, 41 and 42, and NR operating band n79. When a uplink center frequency of a first operating band among the E-UTRA operating bands and the NR operating band n79 is a first value and a downlink center frequency of the first operating band is a second value, MSD (Maximum Sensitivity Degradation) may be pre-configured. Based on dual uplink operation, the MSD may be applied to a reference sensitivity used for reception of the downlink signal.

When the transceiver is configured to use the E-UTRA operating bands 1 and 41, the first operating band may be the E-UTRA operating band 41, the first value is 2530 MHz, and the second value is 2530 MHz, the MSD is 29.4 dB.

When the transceiver is configured to use the E-UTRA operating bands 1 and 41, the first operating band is the E-UTRA operating band 41, the first value may be 2687.5 MHz, and the second value is 2687.5 MHz, the MSD is 0.0 dB.

When the transceiver is configured to use the E-UTRA operating bands 1 and 42, the first operating band is the E-UTRA operating band 42, the first value is 3490 MHz, and the second value is 3490 MHz, the MSD may be 4.8 dB.

When the transceiver is configured to use the E-UTRA operating bands 1 and 42, the first operating band is the E-UTRA operating band 1, the first value is 1975 MHz, and the second value is 2165 MHz, the MSD may be 15.5 dB.

When the transceiver is configured to use the E-UTRA operating bands 1 and 42, the first operating band is the E-UTRA operating band 1, the first value is 1950 MHz, and the second value is 2140 MHz, the MSD may be 9.3 dB.

When the transceiver is configured to use the E-UTRA operating bands 1 and 18, the first operating band is the E-UTRA operating band 18, the first value is 820 MHz, and the second value is 865 MHz, the MSD may be 8.9 dB.

When the transceiver is configured to use the E-UTRA operating bands 1 and 28, the first operating band is the E-UTRA operating band 28, the first value is 733 MHz, and the second value is 788 MHz, the MSD may be 15.2 dB.

When the transceiver is configured to use the E-UTRA operating bands 1 and 28, the first operating band is the E-UTRA operating band 28, the first value is 740 MHz, and the second value is 795 MHz, the MSD may be 10.0 dB.

when the transceiver is configured to use the E-UTRA operating bands 1 and 28, the first operating band is the E-UTRA operating band 1, the first value is 1977.5 MHz, and the second value is 2167.5 MHz, the MSD may be 1.2 dB.

when the transceiver is configured to use the E-UTRA operating bands 1 and 28, the first operating band is the E-UTRA operating band 1, the first value is 1935 MHz, and the second value is 2125 MHz, the MSD may be 4.5 dB.

when the transceiver is configured to use the E-UTRA operating bands 3 and 28, the first operating band is the E-UTRA operating band 28, the first value is 725 MHz, and the second value is 780 MHz, the MSD may be 10.3 dB.

When the transceiver is configured to use the E-UTRA operating bands 21 and 28, the first operating band is the E-UTRA operating band 21, the first value is 1450 MHz, and the second value is 1498 MHz, the MSD may be 5.2 dB.

When the transceiver is configured to use the E-UTRA operating bands 28 and 42, the first operating band is the E-UTRA operating band 42, the first value is 3420 MHz, and the second value is 3420 MHz, the MSD may be 15.3 dB.

According to the disclosure of the present disclosure, the problem of the above described may be solved.

BRIEF DESCRIPTION OF THE DRAWINGS

FIG. 3 depicts a case where $\mu=0$.

FIG. 4 depicts a case where $\mu=1$.

DESCRIPTION OF EXEMPLARY EMBODIMENTS

Figure 1:
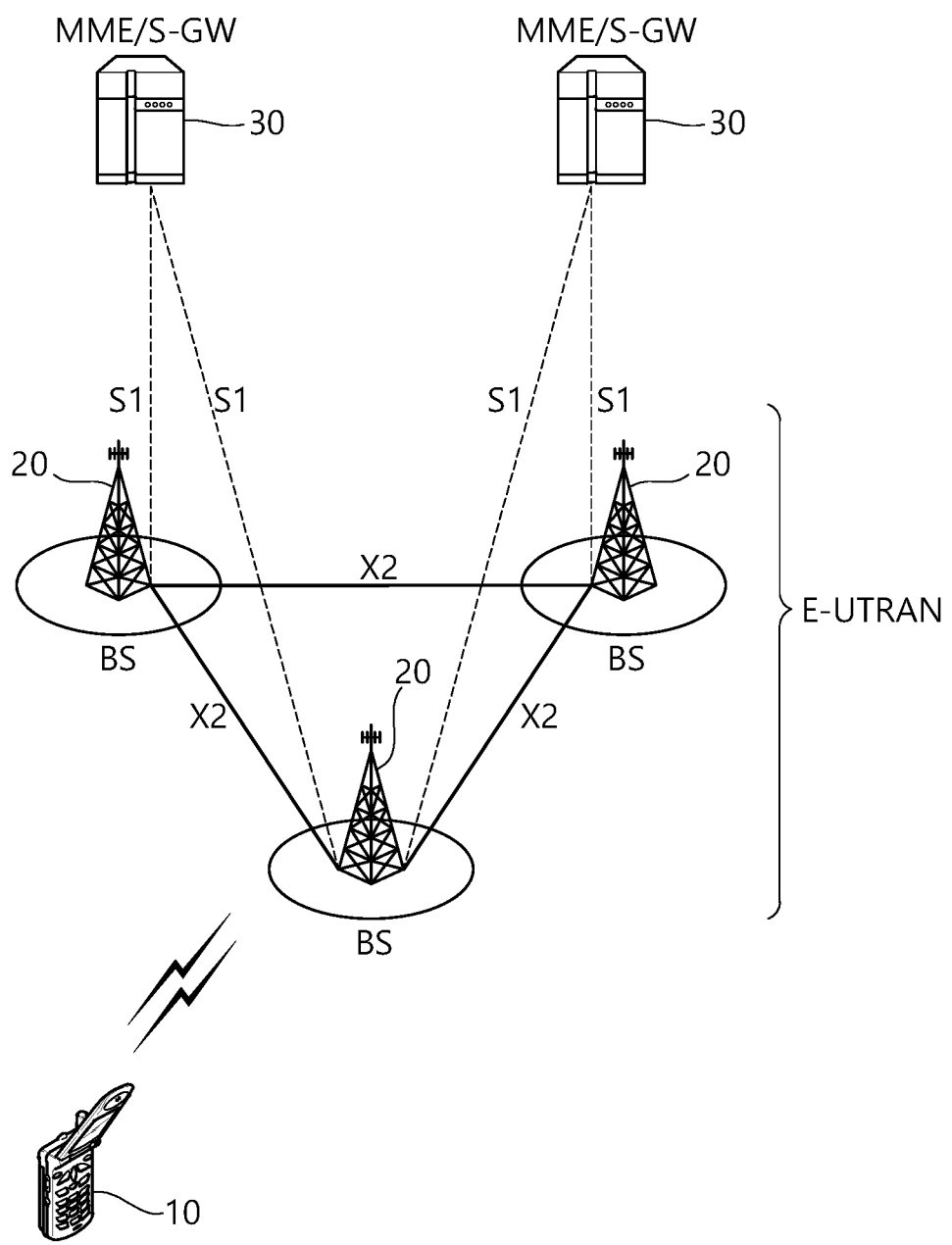
FIG. 1 shows an example of a wireless communication system to which technical features of the present disclosure may apply.

The technical features to be described below may be used in communication standards established by 3rd Generation Partnership Project (3GPP) standardization organizations or communication standards established by Institute of Electrical and Electronics Engineer (IEEE) standardization organizations. For example, the communication standards established by the 3GPP standardization organizations include Long Term Evolution (LTE) and/or enhancements of the LTE systems. The enhancements of the LTE systems include LTE-A (Advanced), LTE-A Pro, and/or 5G New Radio (NR). The communication standards established by the IEEE standardization organizations include wireless local area network systems such as IEEE 802.11a/b/g/ac/ax. The aforementioned systems use various multiple access technologies such as Orthogonal Frequency Division Multiple Access (OFDMA), and/or Single Carrier-Frequency Division Multiple Access (SC-FDMA) in uplink and/or downlink. For example, the OFDMA only can be used for downlink, and the SC-FDMA only can be used in uplink. Alternatively, the OFDMA and SC-FDMA can be used in combination in uplink and/or downlink.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

FIG. 1 shows an example of a wireless communication system to which technical features of the present embodiment may apply.

Specifically, FIG. 1 shows an example based on Evolved-Universal Terrestrial Radio Access Network (E-UTRAN). The aforementioned LTE is part of Evolved-UMTS (E-UMTS) which uses Evolved-Universal Terrestrial Radio Access Network (E-UTRAN).

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), a wireless device, and a station (STA). The base station 20 refers to a fixed station that communicates with the UE 10, and may be referred to as other terms such as an evolved-NodeB (eNB), a base transceiver system (BTS), and an access point.

Base stations 20 may be connected to each other through an X2 interface. The base station 20 is connected to an evolved packet core (EPC) 30 through an S1 interface, and more particularly, connected to a mobility management entity (MME) through an S1-MME and to a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Figure 2:
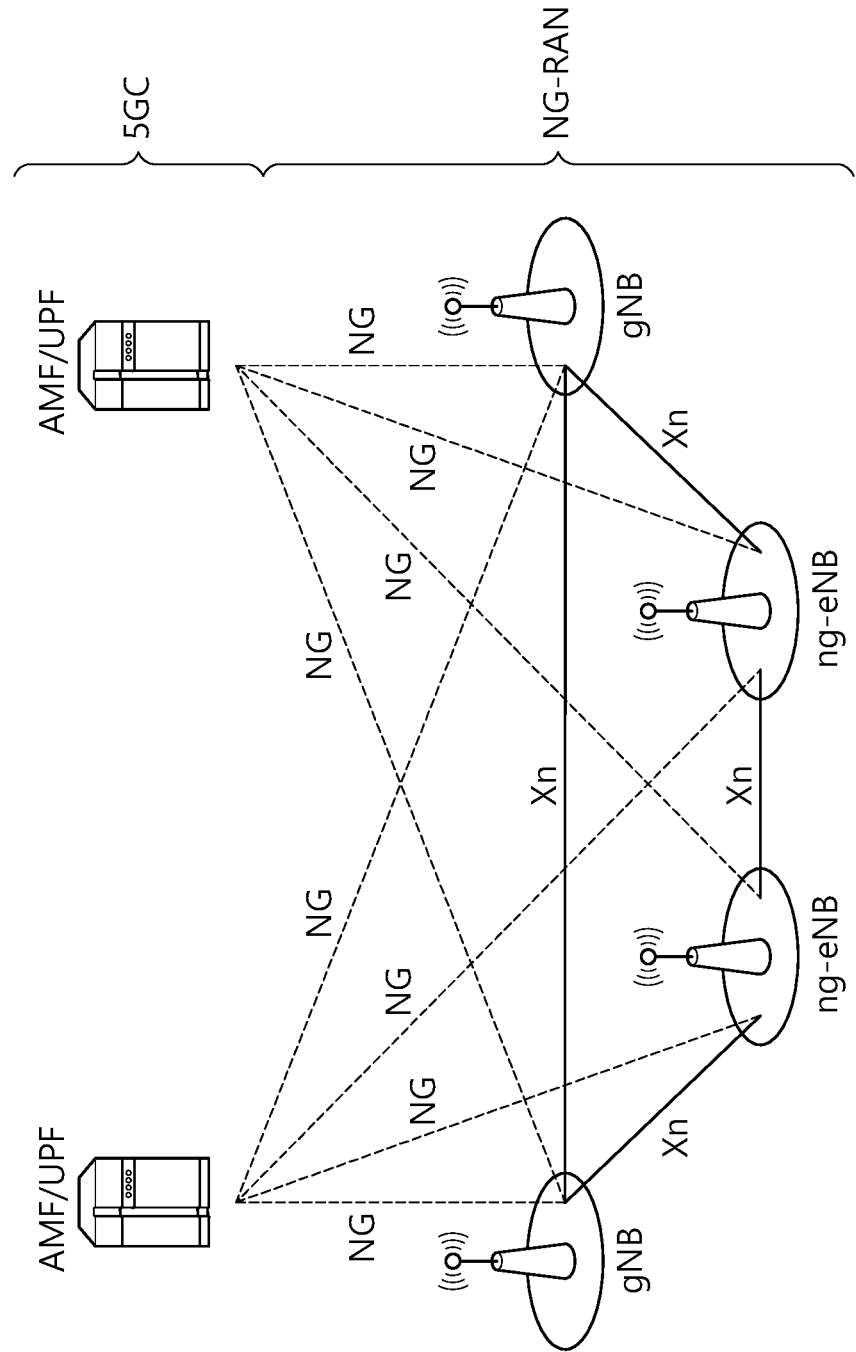
FIG. 2 shows another example of a wireless communication system to which technical features of the present disclosure may apply.

FIG. 2 shows another example of a wireless communication system to which technical features of the present embodiment may apply.

Specifically, FIG. 2 shows an example in which 5G New Radio (NR) standards are used. A communication entity used for the 5G NR standards absorbs some or all of the functions of the entity (e.g., eNB, MME, and S-GW) introduced in FIG. 1, which may be identified by the name "NG" so as to distinguish these standards from the existing/conventional standards.

The system of FIG. 2 includes NG-Radio Access Network (RAN) which communicates with the UE, and the NG-RAN 21 and 22 includes gNB 21 or ng-eNB 22 which are entities corresponding to base stations. A network interface, which is called an Xn interface, is defined between the NG-RAN entities 21 and 22. The gNB 21 provides an NR user plane and control plane for the UE, and accesses 5G Core network (5GC) through an NG interface shown in FIG. 2. The Ng-eNB 22 is an entity that provides Evolved-Universal Terrestrial Radio Access (UTRA)-based user plane and control plane for the UE, and accesses the 5GC through the NG interface.

The Access and Mobility Management Function (AMF) is an entity that includes the conventional MME function, and communicates with the NG-RAN 21 and 22 through an NG-C interface. The NG-C interface is a control plane interface between the NG-RAN and the AMF.

The User Plane Function (UPF) is an entity that includes the conventional S-GW function, and communicates with the NG-RAN 21 and 22 through an NG-U interface. The NG-U interface is a user plane interface between the NG-RAN and the AMF.

In the system of FIG. 1 and/or FIG. 2, layers of a radio interface protocol between the network and the UE can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, the structure of a radio frame sent and received through a physical channel will be described.

In the LTE standards (and the enhancements of the LTE standards), one radio frame includes 10 subframes, and one subframe includes two slots. The length of one subframe may be 1 ms, and the length of one slot may be 0.5 ms. The time during which one subframe is transmitted is referred to as a Transmission Time Interval (TTI). The TTI may be a minimum unit for scheduling.

Unlike the LTE standards, the NR standards support various numerologies, and therefore a variety of radio frame structures are established. The NR standards support a plurality of subcarrier spacings in the frequency domain, and NR numerologies are determined by the numerology being used. The following Table 1 tabulates multiple numerologies supported by NR. Each numerology is identified by the index "$\mu$".

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, the subcarrier spacing may be set to either 15, 30, 60, 120, or 240 kHz, and its specific numerical value may be varied. Thus, each spacing (e.g., $\mu$=0, 1, . . . , 4) may be denoted by the first, second, . . . , Nth subcarrier spacings.

As shown in Table 1, some subcarrier spacings may not be used to send user data (for example, Physical Uplink Shared Channel (PUSCH), Physical Downlink Shared Channel (PDSCH), etc.). That is, user data transmission may not be supported for at least one preset subcarrier spacing (for example, 240 kHz).

Moreover, as shown in Table 1, synchronous channels (for example, Primary Synchronization Signal (PSS), Secondary Synchronization Signal (SSS), Physical Broadcast Channel (PBCH), etc.) may not be supported for some subcarrier spacings. That is, synchronous channels may be supported for at least one subcarrier spacing (e.g., 60 kHz).

In the NR standards, the number of slots and the number of symbols may be set differently depending on various numerologies, that is, various subcarrier spacings. A detailed example of this will be given in the following Table 2.

TABLE 2

| μ | Number of symbols in a slot | Number of slots in a radio frame | Number of slots in a subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

According to Table 2, in the first numerology in which "μ=0", one radio frame includes 10 subframes, one subframe corresponds to 1 slot, and 1 slot includes 14 slots. In the present disclosure, the term 'symbol' means a signal transmitted during a specific time period—for example, a signal generated by Orthogonal Frequency Division Multiplexing (OFDM) processing. That is, the term 'symbol' used herein may refer to an OFDM/OFDMA symbol or an SC-FDMA symbol. A cyclic prefix (CP) may be positioned between each symbol.

Figure 3:
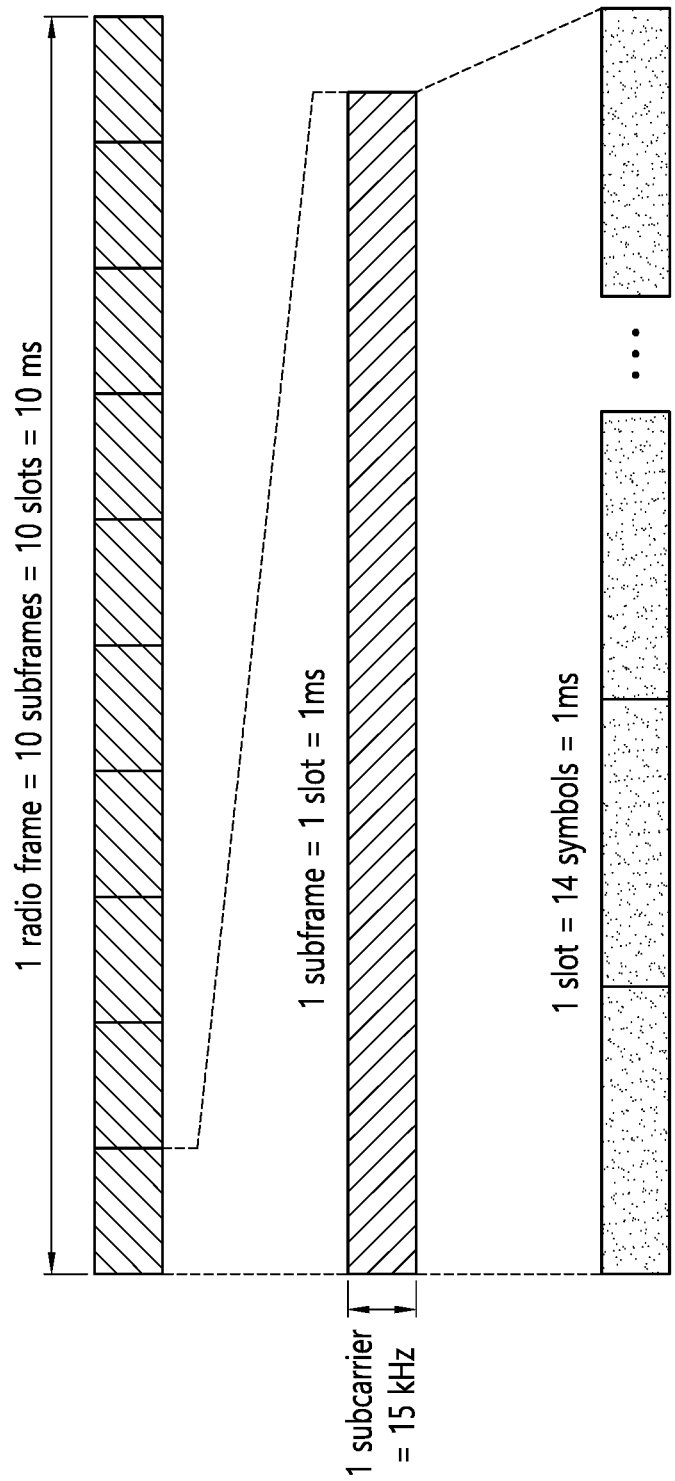
FIG. 3 shows an example of application of a particular numerology. That is.
Figure 4:
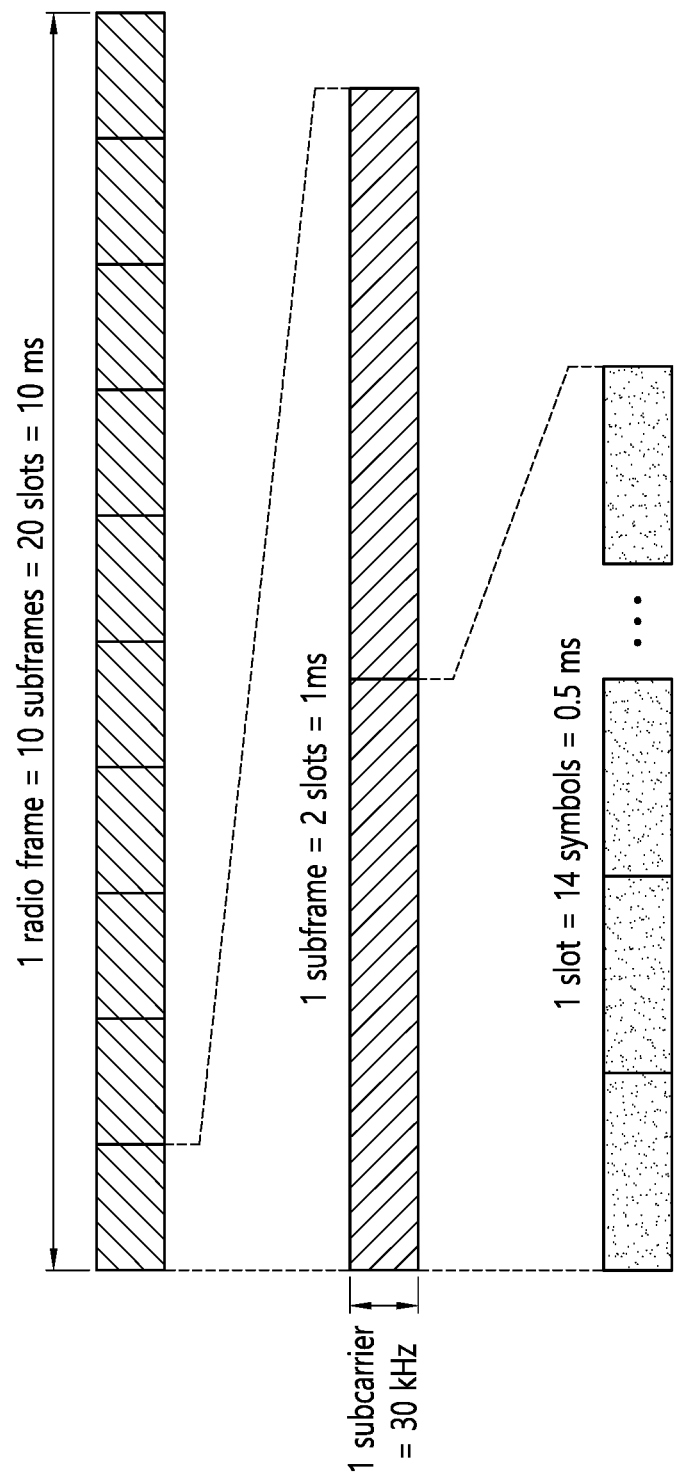
FIG. 4 shows an example of application of another numerology. That is.

FIG. 3 shows an example of application of a particular numerology. That is, FIG. 3 depicts a case in which μ=0. FIG. 4 shows an example of application of another numerology. That is, FIG. 4 depicts a case in which μ=1.

In the example in Table 2, a normal cyclic prefix (CP) may be applied. If an extended CP is applied, the numerology in the following Table 3 may be used.

TABLE 3

| μ | Number of symbols in a slot | Number of slots in a radio frame | Number of slots in a subframe |
|---|---|---|---|
| 2 | 12 | 40 | 4 |

Meanwhile, Frequency Division Duplex (FDD) and/or Time Division Duplex (TDD) may be used in a wireless system in which an example of the present specification is applied. For TDD, in LTE systems, uplink and downlink subframes are allocated in subframes.

In NR standards/systems, each symbol may be distinguished by downlink (denoted by D), flexible (denoted by X), or uplink (denoted by U) as in the following table. The following table may be applied commonly to specific cells or adjacent cells or applied individually or differently to each UE.

TABLE 4

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |

For convenience of explanation, Table 4 shows only some of the formats actually defined in the NR standards, and a specific allocation technique may be changed or added.

The UE may be assigned a slot format (i.e., TDD format) through an upper-layer signal, based on Downlink Control Information (DCI) sent via Physical Downlink Control Channel (PDCCH), or based on a combination of the upper-layer signal (i.e., RRC signal) and the DCI.

Figure 5:
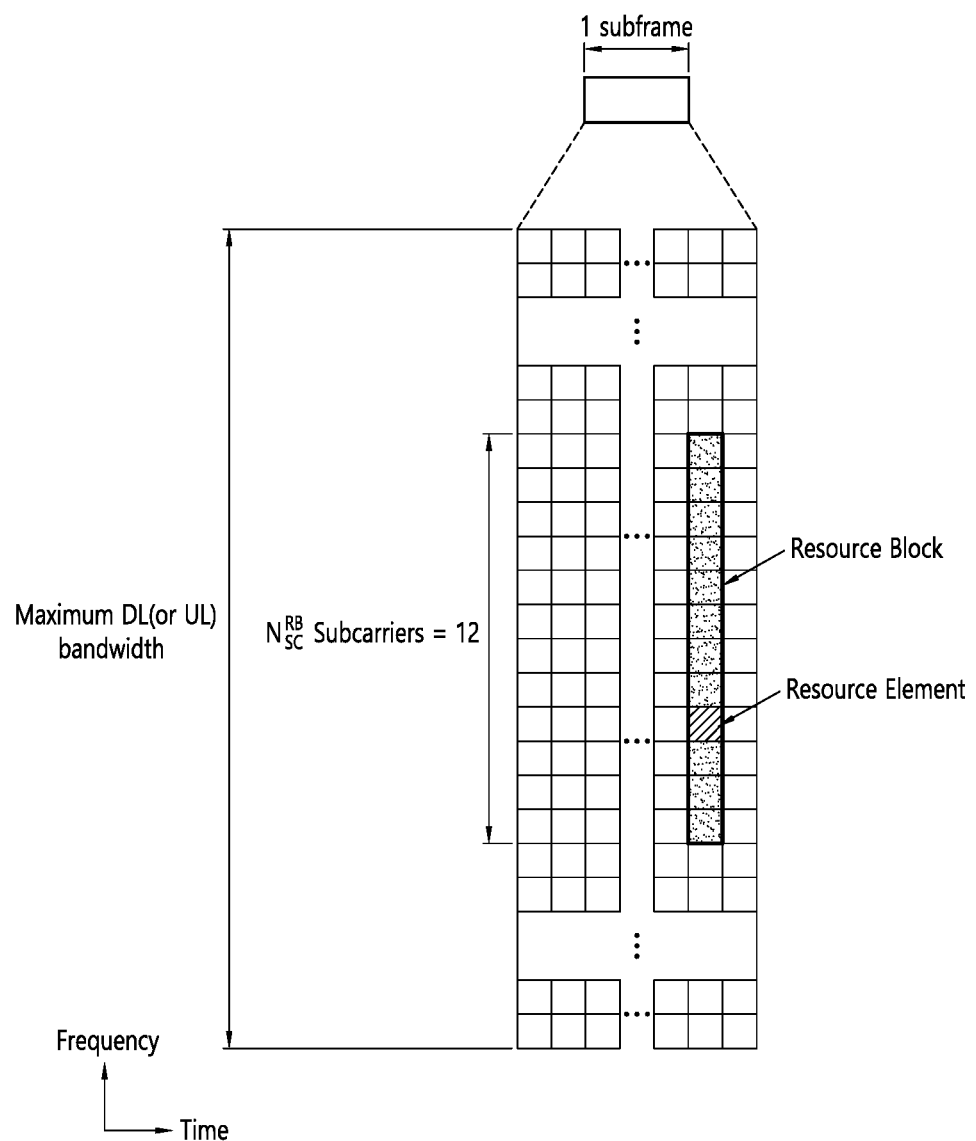
FIG. 5 is a view showing an example of a resource grid.

FIG. 5 is a view showing an example of a resource grid.

The example in FIG. 5 shows a time-frequency resource grid used in the NR standards. The example in FIG. 5 may be applied in uplink and/or downlink. As shown in the drawing, one subframe includes a plurality of slots on the time axis. Specifically, "14·2μ" symbols may be represented within the resource grid based on the μ value. Also, as shown in the drawing, one resource block (RB) may occupy 12 contiguous subcarriers. One resource block may be referred to as a physical resource block (PRB), and each physical resource block may include 12 resource elements (RE). The number of resource blocks RB that can be allocated may be determined based on the smallest value and the largest value. Moreover, the number of resource blocks RB that can be allocated may be set individually according to the numerology "μ". It may have the same value or different values for uplink and downlink.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency, and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called a carrier aggregation system, it should be construed that the carrier aggregation system includes both a case in which the component carriers are contiguous and a case in which the component carriers are non-contiguous. The number of component carriers aggregated between the downlink and the uplink may be differently set. If the number of downlink CCs and the number of uplink CCs are the same, this is referred to as symmetric aggregation, and, if the number of downlink CCs and the number of uplink CCs are different, this is referred to as asymmetric aggregation.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 6A:
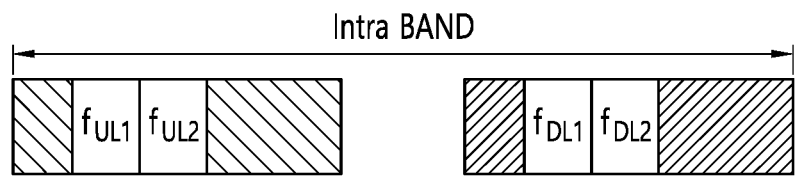
FIGS. 6A and 6B are conceptual views illustrating Intra-Band Carrier aggregation (CA).
Figure 6B:
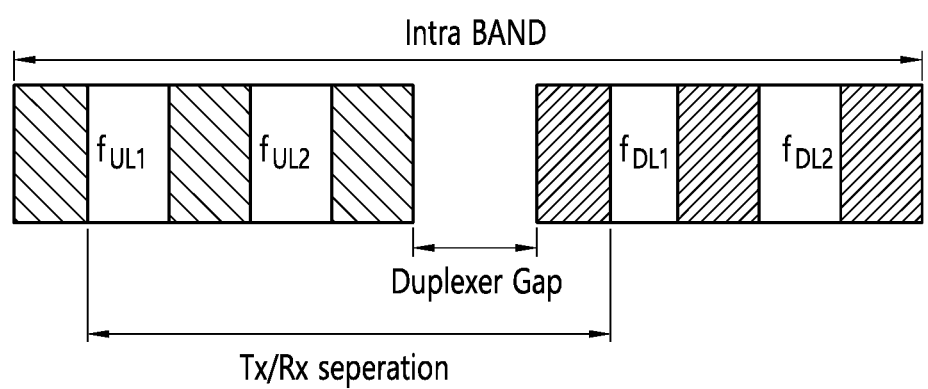

FIGS. 6A and 6B are conceptual views illustrating Intra-Band Carrier aggregation (CA).

FIG. 6A illustrates intra-band contiguous CA, and FIG. 6B illustrates intra-band non-contiguous CA.

LTE-advanced has various schemes added to it, including uplink MIMO and carrier aggregation in order to realize high-speed wireless transmission. The CA that is being discussed in LTE-advanced may be split into the intra-band contiguous CA shown in FIG. 6A and the intra-band non-contiguous CA shown in FIG. 6B.

Figure 7A:
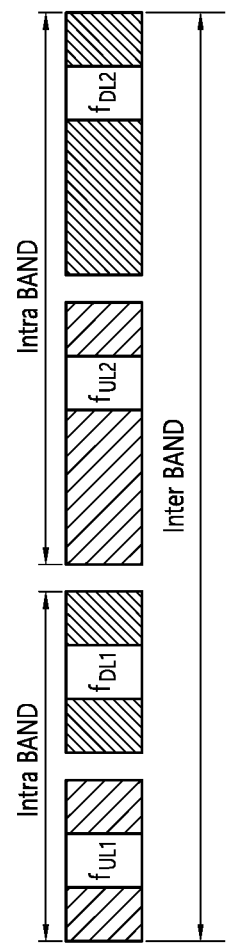
FIGS. 7A and 7B are conceptual views illustrating Inter-Band Carrier Aggregation.
Figure 7B:
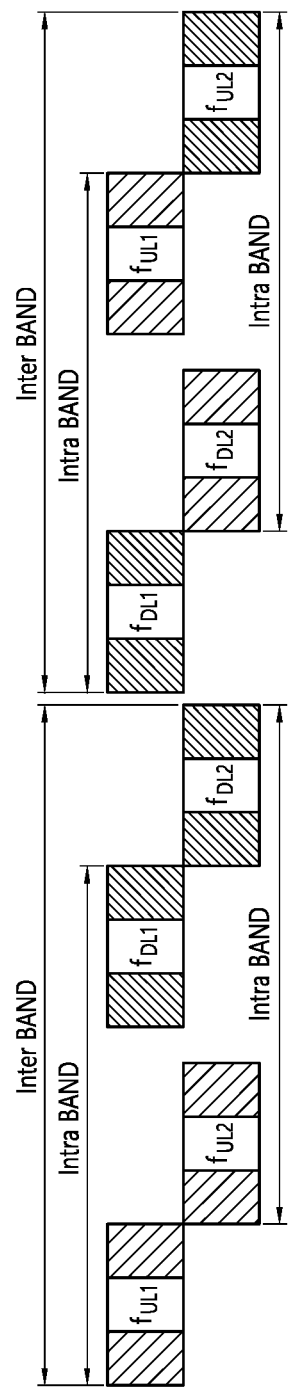

FIGS. 7A and 7B are conceptual views illustrating Inter-Band Carrier Aggregation.

FIG. 7A illustrates a combination of a lower band and a higher band for inter-band CA, and FIG. 7B illustrates a combination of similar frequency bands for inter-band CA.

In other words, the inter-band carrier aggregation may be separated into inter-band CA between carriers of a low band and a high band having different RF characteristics of inter-band CA as shown in FIG. 7A and inter-band CA of similar frequencies that may use a common RF terminal per component carrier due to similar RF (radio frequency) characteristics as shown in FIG. 7B.

<Operating Bands>

E-UTRRA may operate in the operating bands defined in Table 5 below.

TABLE 5

| E-UTRA operating band | Uplink operating band $F_{UL\_low}$-$F_{UL\_high}$ | Downlink operating band $F_{DL\_low}$-$F_{DL\_high}$ | Duplex mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |

TABLE 5-continued

| E-UTRA operating band | Uplink operating band $F_{UL\_low}$-$F_{UL\_high}$ | Downlink operating band $F_{DL\_low}$-$F_{DL\_high}$ | Duplex mode |
|---|---|---|---|
| 31 | 452.5 MHz-457.5 MHz | 462.5 MHz-467.5 MHz | FDD |
| 32 | N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

NR may operate in the FR1 operating bands defined in Table 6 below.

TABLE 6

| NR operating band | Uplink operating band $F_{UL\_low}$-$F_{UL\_high}$ | Downlink operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

NR may operate in the FR2 operating bands defined in Table 7 below.

TABLE 7

| NR operating band | Uplink operating band $F_{UL\_low}$-$F_{UL\_high}$ | Downlink operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

When the operating bands are defined as shown in Table 5, Table 6, and Table 7, each nation's frequency distributing organization may assign specific frequencies to service providers in compliance with the nation's circumstances.

Figure 8:
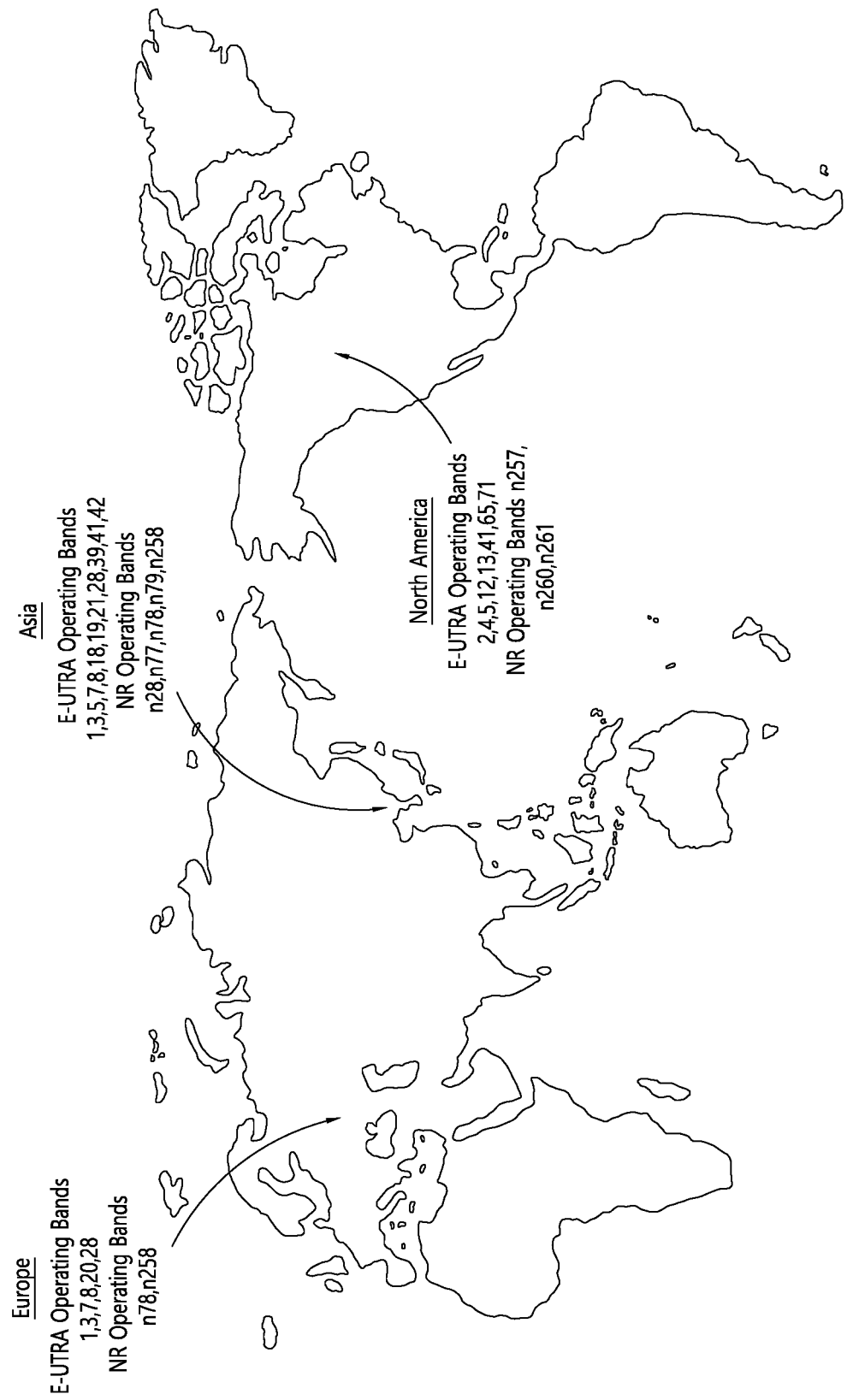
FIG. 8 illustrates an example of operating bands used in each continent.

FIG. 8 illustrates an example of operating bands used in each continent.

As can be seen with reference to FIG. 8, in Europe, bands 1, 3, 7, 8, 20 and 28, among the E-UTRA operating bands according to Table 5, and bands n78 and n258, among the NR operating bands according to Table 6 and FIG. 7, may be used. In Asia, bands 1, 3, 5, 7, 8, 18, 19, 21, 28, 39, 41, and 42, among the E-UTRA operating bands according to Table 5, and bands n28, n77, n78, n79, and n258, among the NR operating bands according to Table 6 and Table 7, may be used. In North America, bands 2, 4, 5, 12, 13, 41, 65, and 71, among the E-UTRA operating bands according to Table 5, and bands n257, n260, and n261, among the NR operating bands according to Table 6 and Table 7, may be used.

Details of the used frequency bands illustrated in FIG. 8 are summarized in Table 8 below.

TABLE 8

| | | Europe | Asia | North America |
|---|---|---|---|---|
| E-UTRA operating band | 1 | ○ | ○ | |
| | 2 | | | ○ |
| | 3 | ○ | ○ | |
| | 4 | | | ○ |
| | 5 | | ○ | ○ |
| | 7 | ○ | ○ | |
| | 8 | ○ | ○ | |
| | 12 | | | ○ |
| | 13 | | | ○ |
| | 18 | | ○ | |
| | 19 | | ○ | |
| | 20 | ○ | | |
| | 21 | | ○ | |
| | 28 | ○ | ○ | |
| | 39 | | ○ | |
| | 41 | | ○ | ○ |
| | 42 | | ○ | |
| | 65 | | | ○ |
| | 71 | | | ○ |
| NR operating band | n28 | | ○ | |
| | n77 | | ○ | |
| | n78 | ○ | ○ | |
| | n79 | | ○ | |
| | n257 | | | ○ |
| | n258 | ○ | ○ | |
| | n260 | | | ○ |
| | n261 | | | ○ |

Referring to FIG. 8 and Table 8, different frequency bands are used in each continent (region). In some cases, some frequency bands may be commonly used in each continent. For example, the E-UTRA operating bands 1, 3, 7, and 8 are frequency bands commonly used in Europe and Asia, and E-UTRA operating bands 5 and 41 are frequency bands commonly used in Asia and North America.

Meanwhile, the frequency bands used in each continent (region) are not limited to FIG. 8 and Table 8. That is, even a frequency band not shown in FIG. 8 and Table 8 also may be used in each continent (region).

Meanwhile, in the current 5G NR technology, a scheme (EN-DC) of dually connecting LTE and NR is underway to ensure communication stability. However, in a state in which a downlink carrier using LTE and a downlink carrier using NR are aggregated, transmission of an uplink signal may cause a harmonic component and an intermodulation distortion (IMD) component to affect a downlink band of the UE itself.

Specifically, the UE must be set to satisfy a reference sensitivity power level (REFSENS), which is minimum average power for each antenna port of the UE. However, in a case where the harmonic component and/or IMD component are generated, the REFSENS for the downlink signal may not be satisfied. That is, the REFSENS must be set such that throughput thereof is at least 95% of maximum throughput of a reference measurement channel, but the generation of the harmonic component and/or IMD component may cause the throughput to fall below 95%.

Thus, it is determined whether a harmonic component and/or IMD component have been generated in the EN-DC terminal (or EN-DC user equipment (UE)) or not, and, when it is determined that the harmonic component and IMD component have been generated, a maximum sensitivity degradation (MSD) value for a corresponding frequency band may be defined to allow relaxation for the REFSENS in a reception band of the EN-DC terminal based on a transmission signal of the EN-DC terminal. Here, the MSD is maximum allowable degradation of REFSENS, and in a certain frequency band, the REFSENS may be relaxed by the defined amount of MSD.

Figure 9:
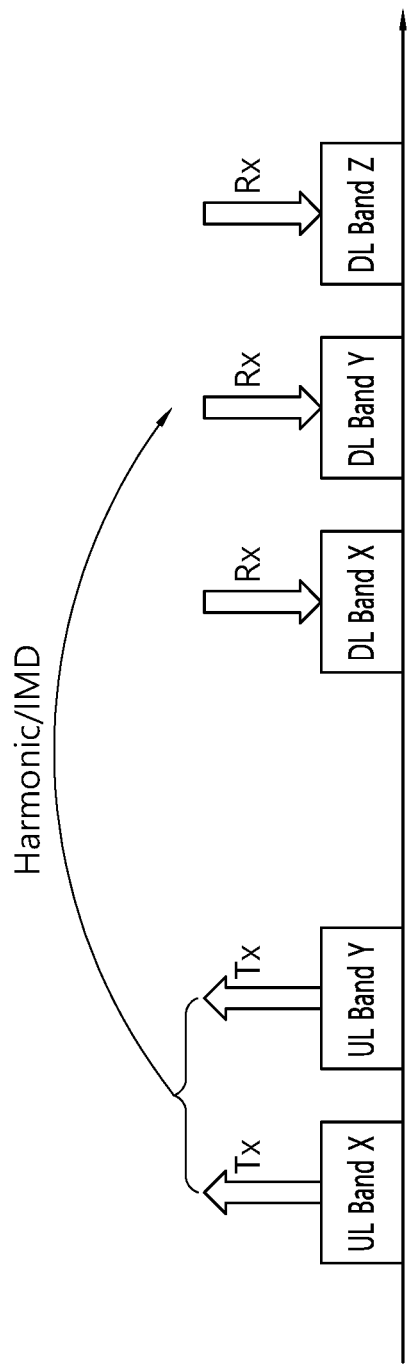
FIG. 9 illustrates that, when an uplink signal is transmitted through an uplink carrier, a harmonic component and an intermodulation distortion (IMD) component enter downlink bands of the UE.

FIG. 9 illustrates that, when an uplink signal is transmitted through an uplink carrier, a harmonic component and an intermodulation distortion (IMD) component enter downlink bands of the UE.

Referring to FIG. 9, in a case where three downlink bands are established by carrier aggregation and two uplink bands are established, when the UE transmits an uplink signal through two uplink bands, the harmonic component and the IMD component may enter downlink bands of the UE.

In this situation, an MSD value capable of correcting the REFSENS is proposed to prevent reception sensitivity of a downlink signal from deteriorating due to the harmonic component and/or IMD component.

In addition, although the UE appropriately solves the problem, a degradation of a reception sensitivity level in the downlink band of the UE may not be completely prevented due to cross isolation and coupling loss due to the PCB, a scheme for relaxing the existing requirements that the UE must meet is proposed.

<Disclosure of the Present Disclosure>

Hereinafter, in a case where the UE transmits an uplink signal through two uplink carriers when multiple downlink carriers and multiple plink carriers are aggregated, any leakage of interference to a downlink band of the UE is analyzed and a solution thereto is subsequently proposed.

I. Analysis of Harmonics

Hereinafter, the harmonics of an EN_DC_20A_28A-n75A band combination will be analyzed.

Table 9 shows the operating bands and duplex modes in EN_DC_20A_28A-n75A.

TABLE 9

| EN-DC operating band | E-UTRA and NR bands | Uplink operating band BS reception/UE transmission $F_{UL\_low}$-$F_{UL\_high}$ | Downlink operating band BS transmission/UE reception $F_{DL\_low}$-$F_{DL\_high}$ | Duplex mode |
|---|---|---|---|---|
| DC_20A_n28A-n75A | 20 | 832 MHz-862 MHz | 791 MHz-821 MHz | FDD |
| | n28 | 703 MHz-733 MHz | 758 MHz-788 MHz | |
| | n75 | N/A | 1432 MHz-1517 MHz | SDL |

In Table 9, the E-UTRA operating band 20 may be defined from uplink 703 to 748 MHz and downlink 758 to 803 MHz. Also, the second harmonic of the NR operating band n28 may affect the reception of the NR operating band n75. Accordingly, a harmonic filter for EN_DC_20A_28A-n75A may be taken into consideration in order to reduce the harmonic problem with reception in the NR operating band n75.

Table 10 shows common isolation parameters for RF FE components of EN_DC_20A_28A-n75A UE.

TABLE 10

| | Attenuation Value |
|---|---|
| B28 Tx in PA output | 28 |
| B28 PA H2 attenuation | 35 |
| B28 duplexer H2 attenuation | 33 |
| Harmonic filter | 20 |
| LB switch H2 | 120 |
| Diplexer attenuation | 25 |
| Antenna isolation | 0 |
| Diplexer pathloss | 0.7 |
| MB switch attenuation | 0.7 |
| MB switch | 130/110 (primary/secondary) |
| nB75 Rx filter attenuation | 1.5 |
| nB75 Rx filter | 110/110 (primary/secondary) |
| B28 PA to n75 LNA isolation | 60 |

Table 11 shows common parameters for the analysis of MDM for EN-DC_20A_n28A-n75A.

TABLE 11

| | When a harmonic trap filter is considered | | | |
|---|---|---|---|---|
| | Primary | | Diversity | |
| Parameter | Value | H8 level | Value | H8 level |
| B28 Tx in PA output | 28 | | 28 | |
| B28 PA H2 attenuation | 35 | −7 | 35 | −7 |
| B28 duplexer H2 attenuation | 33 | −40 | 33 | −40 |
| Harmonic filter | 20 | −60 | 20 | −60 |

TABLE 11-continued

When a harmonic trap filter is considered

| | Primary | | Diversity | |
|---|---|---|---|---|
| Parameter | Value | H8 level | Value | H8 level |
| LB switch H2 | −120 | −60.0 | −120 | −60.0 |
| Diplexer attenuation | 25 | −85.0 | 25 | −85.0 |
| Antenna isolation | 0 | −85.0 | 10 | −95.0 |
| Diplexer pathloss | 0.7 | −85.7 | 0.7 | −95.7 |
| MB switch attenuation | 0.7 | −86.4 | 0.7 | −96.4 |
| MB switch | −130 | −86.4 | −110 | −96.2 |
| nB75 Rx filter attenuation | 1.5 | −87.9 | 1.5 | −97.7 |
| nB75 Rx filter | −110 | −87.9 | −110 | −97.5 |
| B28 PA to n75 LNA isolation | 60 | −67.0 | 60 | −67.0 |
| Composite | | −66.96 | | −66.99 |
| After MRC | | 28.1 dB | | |

The second harmonic which affects transmission in the NR operating band n28 needs to be analyzed, in order to use the EN_DC_20A_n28A-n75A band combination.

Accordingly, Table 12 shows the MSD value for CA_n28A-n75A when the common parameters shown in Table 11 are taken into consideration.

TABLE 12

MSD value for second harmonic of NR n75 reception operating band

| UL band | DL band | 5 MHz dB | 10 MHz dB | 15 MHz dB | 20 MHz dB |
|---|---|---|---|---|---|
| n28 | n75 | 28.1 | 25.3 | 24.0 | 22.8 |

Moreover, additional ILs for each vendor caused by the harmonic trap filter are proposed as in Table 13.

TABLE 13

| | IL for UL operating band of NR n28 | IL for DL operating band of NR n28 | Attenuation value (dB) for n75 |
|---|---|---|---|
| Vendor A | 0.5 | 0.52 | 20 |
| Vendor B | 0.53 | 0.47 | 23 |
| Vendor C | 0.44 | 0.42 | 22 |
| Average | 0.49 | 0.47 | 22 |

According to the shared pain access method in LTE CA, additional ILs for NR_n28A-n75A UE are proposed as in Table 14b.

TABLE 14

| Operating band | $\Delta T_{IB,c}$ [dB] in n28 | $\Delta R_{IB,c}$ [dB] in n28 |
|---|---|---|
| NR-CA_n28A-n75A | 0.2 | 0.2 |

The additional ILs proposed in Table 14 may apply in the NR operating band n28 in NR CA n28A-n75A.

Table 15 and Table 16 show $\Delta T_{IB,c}$ and $\Delta R_{IB}$ proposed for the actual EN-DC band combination EN-DC_20A_n28A-n75A.

TABLE 15

| Inter-band DC configuration | E-UTRA and NR bands | $\Delta T_{IB,c}$ [dB] |
|---|---|---|
| DC_20A_n28A-n75A | 20 | 0.5 |
| | n28 | 0.7 |

TABLE 16

| Inter-band DC configuration | E-UTRA and NR bands | $\Delta R_{IB,c}$ [dB] |
|---|---|---|
| DC_20A_n28A-n75A | 20 | 0.0 |
| | n28 | 0.2 |
| | n75 | 0.0 |

That is, the $T_{ib}$ of the NR operating band n28 in the EN-DC_20A_n28A UE may be as shown in Table 15 due to an increase from 0.5 dB by 0.2 dB, and the $R_{ib}$ of the NR operating band n28 in the EN-DC_20A_n28A UE may be as shown in Table 16 due to an increase from 0.0 dB by 0.2 dB.

II. MSD Proposal

Hereinafter, MSD values are proposed to support EN-DC operation even when self-interference affects the UE's own Rx frequency bands regardless of Pcell and Scell.

In an LTE system, a shared antenna RF architecture for non-standalone (NSA) terminals of 6 GHz or lower may be considered. Thus, a shared antenna RF architecture for generic NSA DC UE may be considered to derive MSD values.

However, a separate RF architecture needs to be taken into consideration in the case of some DC band combinations, such as DC_42A-n77A, DC_42A-n78A, and DC_41_n41A, where the operating frequency ranges of the NR band and the LTE band overlap.

Accordingly, for the analysis of MSD for 3DL/2UL DC UE such as DC_42A-n77A, DC_42A-n78A, and DC_41_n41A, parameters and attenuation levels are assumed based on the UE RF FE components shown in Table 17 and Table 18.

Table 17 shows RF component isolation parameters for deriving MSD values at 6 GHz or lower.

TABLE 17

UE ref. architecture

| Component | Triplexer-Diplexer Architecture w/single ant. DC_1A-41A_n77A, DC_1A-41A_n79A, DC_1A-42A_n79A, DC_1A-18A_n79A, DC_1A-28A_n79A, DC_3A-28A_n77A, DC_3A-28A_n79A, DC_21A-28A_n77A, DC_21A-28A_n79A, DC_28A-42A_n79A | | | | Cascaded-Diplexer architecture w/single ant. DC_1A-7A_n78A | | | |
|---|---|---|---|---|---|---|---|---|
| | IP2 (dBm) | IP3 (dBm) | IP4 (dBm) | IP5 (dBm) | IP2 (dBm) | IP3 (dBm) | IP4 (dBm) | IP5 (dBm) |
| Ant. Switch | 112 | 68 | 55 | 55 | 112 | 68 | 55 | 55 |
| Triplexer | 110 | 72 | 55 | 52 | | | | |
| Diplexer | 115 | 87 | 55 | 55 | 115 | 87 | 55 | 55 |
| Duplexer | 100 | 75 | 55 | 53 | 100 | 75 | 55 | 53 |
| PA Forward | 28.0 | 32 | 30 | 28 | 28.0 | 32 | 30 | 28 |
| PA Reversed | 40 | 30.5 | 30 | 30 | 40 | 30.5 | 30 | 30 |
| LNA | 10 | 0 | 0 | −10 | 10 | 0 | 0 | −10 |

Table 18 shows isolation levels for different RF components.

TABLE 18

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Triplexer | 20 | High/low band isolation |
| Quadplexer | 15 | L-L or H-M band isolation |
| Diplexer | 25 | High/low band isolation |

TABLE 18-continued

| Isolation Parameter | Value (dB) | Comment |
|---|---|---|
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Table 19 shows MSD values proposed according to Table 17 and Table 18.

TABLE 19

| DC bands | UL DC | IMD | IMD | UL Fc (MHz) | UL BW (MHz) | UL RB# | DL Fc (MHz) | DL BW (MHz) | CF (dB) | MSD (dB) |
|---|---|---|---|---|---|---|---|---|---|---|
| DC_1A-41A_n77A | 1 | IMD4 | \|3*fB1 − fn77\| | 1970 | 5 | 25 | 2160 | 5 | 0.7 | N/A |
| | n77 | | | 3400 | 10 | 52 | 3400 | 10 | | |
| | 41 | | | 2510 | 5 | 25 | 2510 | 5 | | 9.9 |
| | 1 | IMD5 | \|3*fB1 − 2*fn77\| | 1930 | 5 | 25 | 2120 | 5 | 0.4 | N/A |
| | n77 | | | 4150 | 10 | 52 | 4150 | 10 | | |
| | 41 | | | 2510 | 5 | 25 | 2510 | 5 | | 4.0 |
| DC_1A-41A_n79A | 1 | IMD2 | \|fB1 − fn79\| | 1970 | 5 | 25 | 2160 | 5 | 2.2 | N/A |
| | n79 | | | 4500 | 40 | 216 | 4500 | 40 | | |
| | 41 | | | 2530 | 5 | 25 | 2530 | 5 | | 29.4 |
| | 1 | IMD5 | \|4*fB1 − fn79\| | 1922.5 | 5 | 25 | 2112.5 | 5 | 0 | N/A |
| | n79 | | | 4980 | 40 | 216 | 4980 | 40 | | |
| | 41 | | | 2687.5 | 5 | 25 | 2687.5 | 5 | | 0.0 |
| DC_1A-42A_n79A | 1 | IMD5 | \|4*fB1 − fn79\| | 1977.5 | 5 | 25 | 2167.5 | 5 | 0.6 | N/A |
| | n79 | | | 4420 | 40 | 216 | 4420 | 40 | | |
| | 42 | | | 3490 | 5 | 25 | 3490 | 5 | | 4.8 |
| | 42 | IMD3 | \|2*fB42 − fn79\| | 3402.5 | 5 | 25 | 3402.5 | 5 | 1.6 | N/A |
| | n79 | | | 4640 | 40 | 216 | 4640 | 40 | | |
| | 1 | | | 1975 | 5 | 25 | 2165 | 5 | | 15.5 |
| | 42 | IMD4 | \|2*fB42 − 2*fn79\| | 3450 | 5 | 25 | 3450 | 5 | 0.9 | N/A |
| | n79 | | | 4520 | 40 | 216 | 4520 | 40 | | |
| | 1 | | | 1950 | 5 | 25 | 2140 | 5 | | 9.3 |
| DC_1A-18A_n79A | 1 | IMD4 | \|3*fB1 − fn79\| | 1930 | 5 | 25 | 2120 | 5 | 0.8 | N/A |
| | n79 | | | 4925 | 40 | 216 | 4925 | 40 | | |
| | 18 | | | 820 | 5 | 25 | 865 | 5 | | 8.9 |
| DC_1A-28A_n79A | 1 | IMD3 | \|2*fB1 − fn79\| | 1930 | 5 | 25 | 2120 | 5 | 1.3 | N/A |
| | n79 | | | 4648 | 40 | 216 | 4648 | 40 | | |
| | 28 | | | 733 | 5 | 25 | 788 | 5 | | 15.2 |
| | 1 | IMD4 | \|2*fB1 − 2*fn79\| | 1925 | 5 | 25 | 2115 | 5 | 0.9 | N/A |
| | n79 | | | 4980 | 40 | 216 | 4980 | 40 | | |
| | 28 | | | 740 | 5 | 25 | 795 | 5 | | 10.0 |
| | 28 | IMD4 | \|3*fB28 − fn79\| | 745.5 | 5 | 25 | 800.5 | 5 | 0 | N/A |
| | n79 | | | 4420 | 40 | 216 | 4420 | 40 | | |
| | 1 | | | 1977.5 | 5 | 25 | 2167.5 | 5 | | 1.2 |
| | 28 | IMD5 | \|4*fB28 − fn79\| | 718 | 5 | 25 | 773 | 5 | 0.4 | N/A |
| | n79 | | | 4807 | 40 | 216 | 4807 | 40 | | |
| | 1 | | | 1935 | 5 | 25 | 2125 | 5 | | 4.5 |

TABLE 19-continued

| DC bands | UL DC | IMD | IMD | UL Fc (MHz) | UL BW (MHz) | UL RB# | DL Fc (MHz) | DL BW (MHz) | CF (dB) | MSD (dB) |
|---|---|---|---|---|---|---|---|---|---|---|
| DC_1A-7A_n28A | 1 | IMD2 | \|fB1 + fn28\| | 1935 | 5 | 25 | 2125 | 5 | 2.0 | N/A |
|  | n28 |  |  | 718 | 5 | 25 | 773 | 5 |  |  |
|  | 7 |  |  | 2533 | 10 | 52 | 2653 | 10 |  | 28.8 |
| DC_3A-28A_n77A | 3 | IMD3 | \|2*fB3 − fn77\| | 1712.5 | 5 | 25 | 1807.5 | 5 | 1.6 | N/A |
|  | n77 |  |  | 4195 | 10 | 52 | 4195 | 10 |  |  |
|  | 28 |  |  | 715 | 5 | 25 | 770 | 5 |  | 16.2 |
|  | 28 | IMD3 | \|2*fB28 − fn77\| | 735 | 5 | 25 | 790 | 5 | 1.6 | N/A |
|  | n77 |  |  | 3320 | 10 | 52 | 3320 | 10 |  |  |
|  | 3 |  |  | 1755 | 5 | 25 | 1850 | 5 |  | 16.7 |
| DC_3A-28A_n79A | 3 | IMD4 | \|3*fB3 − fn79\| | 1770 | 5 | 25 | 1865 | 5 | 0.8 | N/A |
|  | n79 |  |  | 4530 | 40 | 216 | 4530 | 40 |  |  |
|  | 28 |  |  | 725 | 5 | 25 | 780 | 5 |  | 10.3 |
|  | 28 | IMD5 | \|4*fB28 − fn79\| | 725 | 5 | 25 | 780 | 5 | 0.5 | N/A |
|  | n79 |  |  | 4770 | 40 | 216 | 4770 | 40 |  |  |
|  | 3 |  |  | 1775 | 5 | 25 | 1870 | 5 |  | 5.7 |
| DC_21A-28A_n77A | 21 | IMD3 | \|2*fB21 − fn77\| | 1452 | 5 | 25 | 1500 | 5 | 1.6 | N/A |
|  | n77 |  |  | 3689.5 | 10 | 52 | 3689.5 | 10 |  |  |
|  | 28 |  |  | 730.5 | 5 | 25 | 785.5 | 5 |  | 15.8 |
|  | 28 | IMD4 | \|3*fB28 − fn77\| | 730.5 | 5 | 25 | 785.5 | 5 | 1.0 | N/A |
|  | n77 |  |  | 3690 | 10 | 52 | 3690 | 10 |  |  |
|  | 21 |  |  | 1450.5 | 5 | 25 | 1498.5 | 5 |  | 11.0 |
| DC_21A-28A_n79A | 28 | IMD5 | \|4*fB28 − fn79\| | 730.5 | 5 | 25 | 785.5 | 5 | 0.5 | N/A |
|  | n79 |  |  | 4420 | 40 | 216 | 4420 | 40 |  |  |
|  | 21 |  |  | 1450 | 5 | 25 | 1498 | 5 |  | 5.2 |
| DC_28A-42A_n79A | 28 | IMD3 | \|2*fB28 − fn79\| | 730 | 5 | 25 | 785 | 5 | 1.5 | N/A |
|  | n79 |  |  | 4880 | 40 | 216 | 4880 | 40 |  |  |
|  | 42 |  |  | 3420 | 5 | 25 | 3420 | 5 |  | 15.3 |
|  | 42 | IMD2 | \|fB42 − fn79\| | 3597.5 | 5 | 25 | 3597.5 | 5 | 0.0 | N/A |
|  | n79 |  |  | 4420 | 40 | 216 | 4420 | 40 |  |  |
|  | 28 |  |  | 745 | 5 | 25 | 800 | 5 |  | 16.2 |

In some embodiments, the MSD values proposed in Table 19 may allow a margin of error of ±1 dB.

Table 20 shows MSD values for DC_1A-18A-n79A in addition to those in Table 19.

TABLE 20

E-UTRA and NR Band/Channel bandwidth/NRB/Duplex mode

| DC Configuration | EUTRA and NR band | UL Fc (MHz) | UL/DL BW (MHz) | UL CLRB | DL Fc (MHz) | MSD (dB) | Duplex mode | Source of IMD |
|---|---|---|---|---|---|---|---|---|
| DC_1A-18A-n79A | 1 | 1935 | 5 | 25 | 2125 | N/A | FDD | N/A |
|  | 18 | 822.5 | 5 | 25 | 867.5 | 18.3 |  | IMD3 |
|  | n79 | 4782.5 | 40 | 216 | 4782.5 | N/A | TDD | N/A |
|  | 1 | 1930 | 5 | 25 | 2120 | N/A | FDD | N/A |
|  | 18 | 820 | 5 | 25 | 865 | 8.9 |  | IMD4 |
|  | n79 | 4925 | 40 | 216 | 4925 | N/A | TDD | N/A |
|  | 1 | 1935 | 5 | 25 | 2125 | 8.1 | FDD | IMD4 |
|  | 18 | 822.5 | 5 | 25 | 867.5 | N/A |  | N/A |
|  | n79 | 4782.5 | 40 | 216 | 4782.5 | N/A | TDD | N/A |

Figure 10:
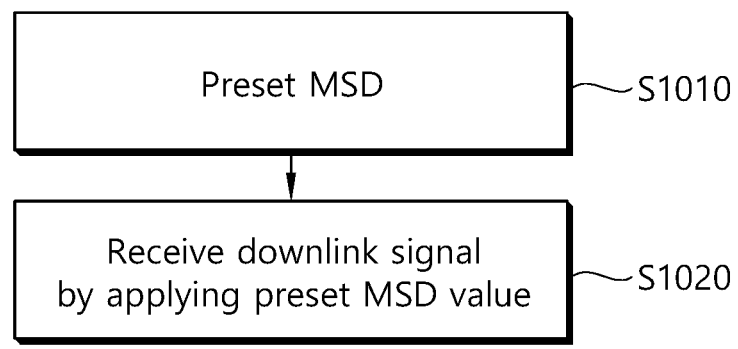
FIG. 10 is a flowchart according to a disclosure of the present specification.
Figure 11:
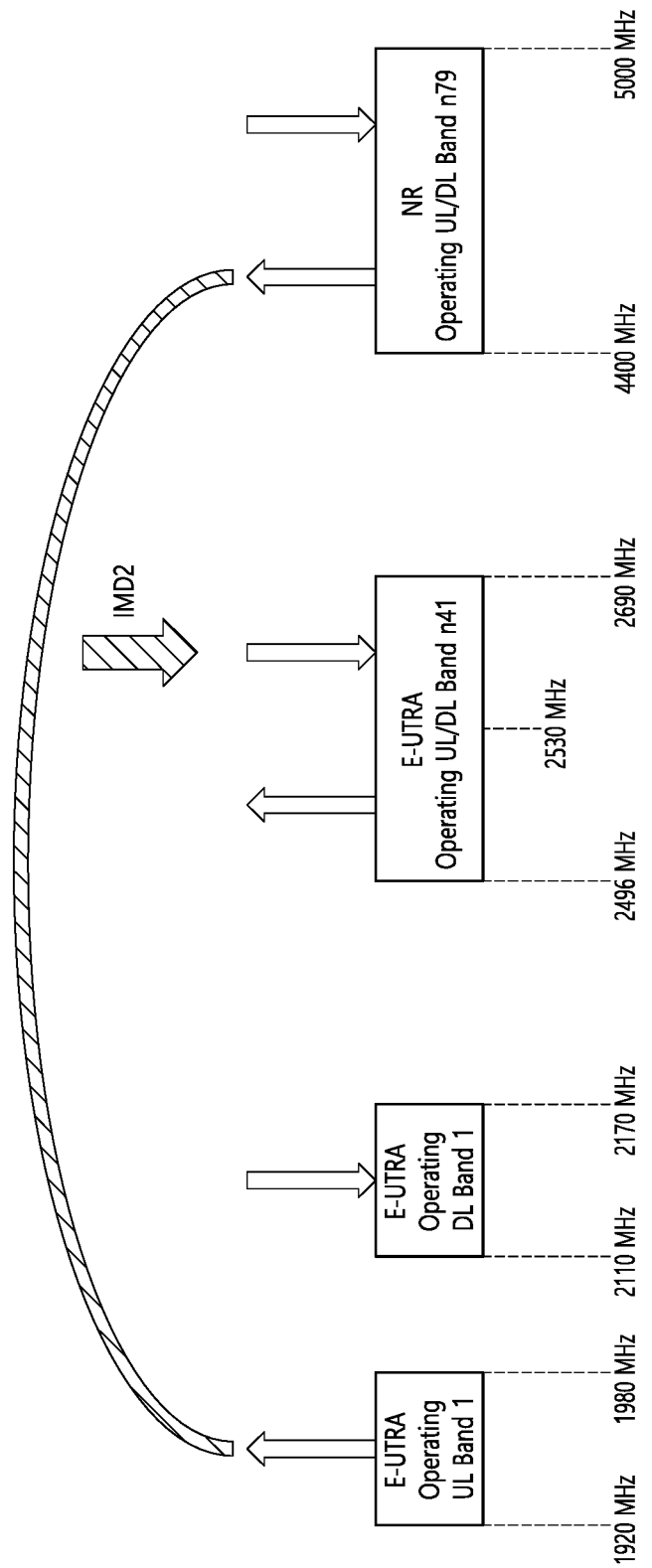
FIG. 11 illustrates an example according to a disclosure of the present specification.

FIG. 10 is a flowchart according to a disclosure of the present specification, and FIG. 11 illustrates an example according to a disclosure of the present specification.

Referring to FIG. 10, a UE supporting dual-connectivity between E-UTRA and NR may preset a maximum sensitivity degradation (MSD) regarding reference sensitivity (REFSENS) to apply the same to reception of a downlink signal (S1010). When receiving a downlink signal, the UE may receive the downlink signal by applying the preset MSD value (S1020).

As described above with reference to FIG. 9, in the case of a UE supporting dual-connectivity between E-UTRA and NR, when the UE transmits an uplink signal through two uplink bands, a harmonic component (harmonics) and/or an intermodulation distortion (IMD) component generated according to a frequency band of the uplink signal may enter a downlink band of the UE. Here, in order to prevent a degradation of reception sensitivity of the downlink signal due to the harmonic component and/or IMD component, the UE may apply maximum sensitivity degradation (MSD) correcting the REFSENS.

Here, the preset MSD may be an MSD value described in Table 19 and Table 20. That is, when the conditions described in Table 19 and Table 20 are applied, the UE may receive the downlink signal by applying the proposed MSD value.

For example, referring to FIG. 11 and Table 19, when the UE supports dual-connectivity between the E-UTRA operating bands 1 and 41 and the NR operating band n79, if an uplink center frequency and downlink center frequency of the E-UTRA operating band 41 are 2530 MHz, the second IMD (IMD2) may enter the downlink operating band. Thus, in order to prevent a degradation of reception sensitivity of the downlink signal due to the second IMD component IMD2, the MSD value may be set to 29.4 dB to correct reference sensitivity.

Moreover, FIG. 10 also may apply to a UE supporting NR CA. That is, a UE supporting NR CA may preset a maximum sensitivity degradation (MSD) regarding reference sensitivity (REFSENS) to apply the same to reception of a downlink signal (S1010). When receiving a downlink signal, the UE may receive the downlink signal by applying the preset MSD value (S1020).

Here, the preset MSD may be an MSD value described in Table 12. That is, when the conditions described in Table 12 are applied, the UE may receive the downlink signal by applying the proposed MSD value.

For example, referring to Table 12, when the UE supports CA of the NR operating bands n28 and n75, if SCS is 5 MHz, the second IMD (IMD2) may enter the downlink operating band of the NR operating band n75. Thus, in order to prevent a degradation of reception sensitivity of the downlink signal due to the second IMD component IMD2, the MSD value may be set to 28.1 dB to correct reference sensitivity.

Figure 12:
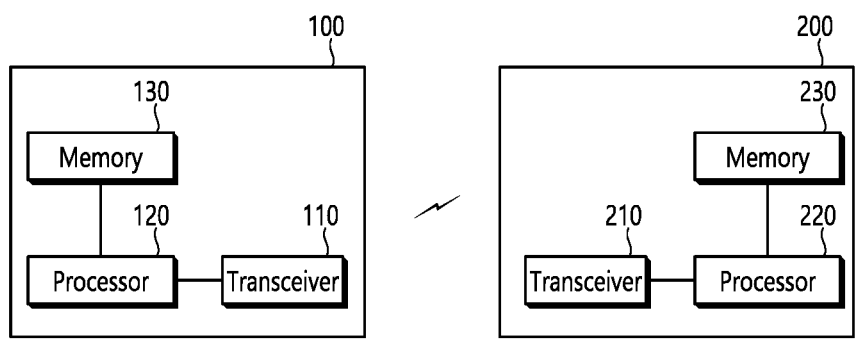
FIG. 12 is a block diagram illustrating a wireless communication system according to one embodiment of a disclosure of the present specification.

FIG. 12 is a block diagram illustrating a wireless communication system according to one embodiment of a disclosure of the present specification.

Referring to FIG. 12, the wireless communication system may comprise at least one user equipment (UE) 100 and a base station 200.

The UE 100 may comprise a transceiver 110, a processor 120, and a memory 130. The memory 130 may be connected to the processor 120 to store various information for driving the processor 120. The transceiver 110 may be connected to the processor 120 to transmit and/or receive radio signals. The processor 120 may implement the proposed functions, processes, and/or methods.

The UE 100 may support dual-connectivity between E-UTRA and NR. When the UE 100 is configured to aggregate at least two carriers, the processor 120 may control the transceiver 110 to transmit the uplink signal using the uplink of the at least two carriers and receive the downlink signal using the downlink of the at least two carriers.

If the at least two carriers include at least one of the E-UTRA operating bands 1, 3, 5, 7, 18, 21, 28, 41, and 42 and one of the NR operating bands n28, n77, and n79, the processor 120 may receive the downlink signal by applying a preset MSD according to Table 19 and Table 20.

That is, in the case of the UE 100 supporting dual-connectivity between E-UTRA and NR, when the UE 100 transmits an uplink signal through two uplink bands, the harmonic component and/or IMD component generated according to a frequency band of the uplink signal may enter a downlink band of the UE 100, and thus, in order to prevent a degradation of reception sensitivity of the downlink signal due to the harmonic component and/or IMD component, the UE 100 may receive downlink signal by applying the MSD to correct the REFSENS.

The UE 100 may support NR CA. When the UE 100 is configured to aggregate the NR operating bands n28 and n79, the processor 120 may receive the downlink signal of the NR operating band n79 by applying a preset MSD according to Table 19 and Table 20.

The base station 200 may comprise a transceiver 210, a processor 220, and a memory 230. The memory 230 may be connected to the processor 220 to store various information for driving the processor 220. The transceiver 210 may be connected to the processor 220 to transmit and/or receive radio signals. The processor 220 may implement the proposed functions, processes, and/or methods.

The base station 200 may receive an uplink signal from the UE 100 using the transceiver 210 and transmit a downlink signal to the UE 100 using the transceiver 210. When the base station 200 transmits the downlink signal, the UE 100 may receive the downlink signal by using a preset MSD value according to Table 12, Table 19, and Table 20.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When an embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

The embodiments of the present disclosure which has been described up to now may be implemented through various means. For example, the embodiments of the present disclosure may be implemented by hardware, firmware, software, or combinations thereof. In detail, the embodiments will be descried with reference to the drawings.

Figure 13:
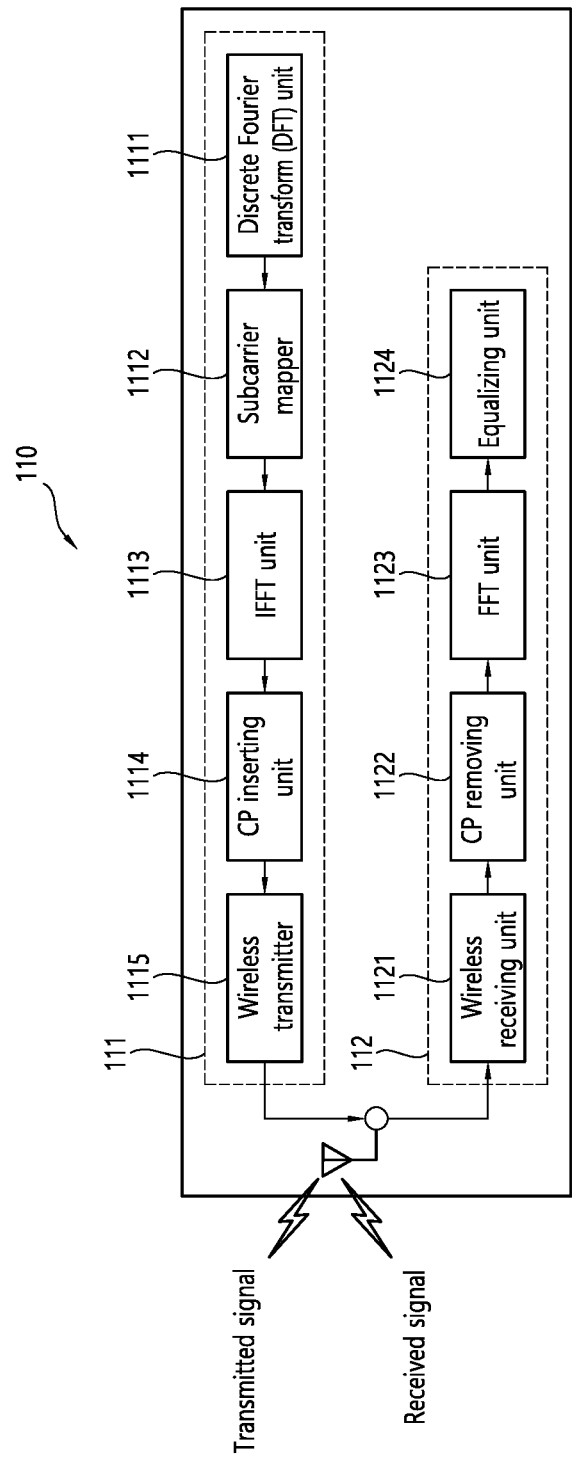
FIG. 13 is a detailed block diagram of the transceiver of the wireless device illustrated in FIG. 12.

FIG. 13 is a detailed block diagram of the transceiver of the wireless device illustrated in FIG. 12.

Referring to FIG. 13, the transceiver 110 includes a transmitter 111 and a receiver 112. The transmitter 111 includes a discrete Fourier transform (DFT) unit 1111, a subcarrier mapper 1112, an IFFT unit 1113, a CP inserting unit 1114, and a wireless transmitter 1115. The transmitter 111 may further include a modulator. The transceiver 110 may further include a scramble unit, a modulation mapper (not shown), a layer mapper, and a layer permutator, which may be arranged before the DFT unit 1111. That is, in order to prevent an increase in peak-to-average power ratio (PAPR), the transmitter 111 first passes information through the DFT 1111 before mapping a signal to a subcarrier. A signal spread (or precoded in the same sense) by the DFT unit 1111 is subcarrier-mapped through the subcarrier mapper 1112 and then made to a signal on a time axis through the inverse fast Fourier transform (IFFT) unit 1113.

The DFT unit 1111 performs DFT on the input symbols to output complex-valued symbols. For example, when Ntx symbols are input (however, Ntx is a natural number), the DFT size is Ntx. The DFT unit 1111 may be referred to as a transform precoder. The subcarrier mapper 1112 maps the complex-valued symbols to subcarriers in the frequency domain. The complex-valued symbols may be mapped to resource elements corresponding to resource blocks allocated for data transmission. The subcarrier mapper 1112 may be referred to as a resource element mapper. The IFFT unit 1113 performs IFFT on the input symbol and outputs a baseband signal for data, which is a time domain signal. The CP inserting unit 1114 copies a part of the rear part of the base band signal for data and inserts the copied rear part to the front part of the base band signal for data. Inter-symbol interference (ISI) and inter-carrier interference (ICI) are prevented through CP insertion, and orthogonality may be maintained in a multi-path channel.

On the other hand, the receiver 112 includes a wireless receiving unit 1121, a CP removing unit 1122, an FFT unit 1123, and an equalizing unit 1124. The wireless receiving unit 1121, the CP removing unit 1122 and the FFT unit 1123 of the receiver 112 perform a reverse function of the wireless transmitter 1115, the CP inserting unit 1114 and the IFFT unit 1113 of the transmitter 111. The receiver 112 may further include a demodulator.

What is claimed is:

1. A method for transmitting and receiving a signal by a user equipment (UE) supporting dual-connectivity with evolved universal terrestrial radio access (E-UTRA) and new radio (NR), the method comprising:

transmitting an uplink signal based on the dual-connectivity; and receiving a downlink signal based on the dual-connectivity, wherein, the UE is configured to use i) two E-UTRA operating bands from among E-UTRA operating bands 1, 3, 18, 21, 28, 41, and 42 and ii) an NR operating band n79, wherein for a specific operating band, from among the two E-UTRA operating bands and the NR operating band n79, with an uplink center frequency of a first value and with a downlink center frequency of a second value, MSD (maximum sensitivity degradation) is pre-configured, wherein the MSD is applied to reference sensitivity used for reception of the downlink signal, based on a dual uplink operation, and wherein, based on i) the UE being configured to use the E-UTRA operating bands 1 and 41, ii) the specific operating band being the E-UTRA operating band 41, iii) the first value being 2530 MHz, and iv) the second value being 2530 MHz, the MSD is 29.4 dB, wherein, based on i) the UE being configured to use the E-UTRA operating bands 1 and 42, ii) the specific operating band being the E-UTRA operating band 42, iii) the first value being 3490 MHz, and iv) the second value being 3490 MHz, the MSD is 4.8 dB, wherein, based on i) the UE being configured to use the E-UTRA operating bands 1 and 42, ii) the specific operating band being the E-UTRA operating band 1, iii) the first value being 1975 MHz, and iv) the second value being 2165 MHz, the MSD is 15.5 dB, wherein, based on i) the UE being configured to use the E-UTRA operating bands 1 and 42, ii) the specific operating band being the E-UTRA operating band 1, iii) the first value being 1950 MHz, and iv) the second value being 2140 MHz, the MSD is 9.3 dB, wherein, based on i) the UE being configured to use the E-UTRA operating bands 1 and 18, ii) the specific operating band being the E-UTRA operating band 18, iii) the first value being 820 MHz, and iv) the second value being 865 MHz, the MSD is 8.9 dB, wherein, based on i) the UE being configured to use the E-UTRA operating bands 1 and 28, ii) the specific operating band being the E-UTRA operating band 28, iii) the first value being 733 MHz, and iv) the second value being 788 MHz, the MSD is 15.2 dB, wherein, based on i) the UE being configured to use the E-UTRA operating bands 1 and 28, ii) the specific operating band being the E-UTRA operating band 28, iii) the first value being 740 MHz, and iv) the second value being 795 MHz, the MSD is 10.0 dB, wherein, based on i) the UE being configured to use the E-UTRA operating bands 1 and 28, ii) the specific operating band being the E-UTRA operating band 1, iii) the first value being 1977.5 MHz, and iv) the second value being 2167.5 MHz, the MSD is 1.2 dB, wherein, based on i) the UE being configured to use the E-UTRA operating bands 1 and 28, ii) the specific operating band being the E-UTRA operating band 1, iii) the first value being 1935 MHz, and iv) the second value being 2125 MHz, the MSD is 4.5 dB, wherein, based on i) the UE being configured to use the E-UTRA operating bands 3 and 28, ii) the specific operating band being the E-UTRA operating band 28, iii) the first value being 725 MHz, and iv) the second value being 780 MHz, the MSD is 10.3 dB, wherein, based on i) the UE being configured to use the E-UTRA operating bands 21 and 28, ii) the specific operating band being the E-UTRA operating band 21, iii) the first value being 1450 MHz, and iv) the second value being 1498 MHz, the MSD is 5.2 dB, wherein, based on i) the UE being configured to use the E-UTRA operating bands 28 and 42, ii) the specific operating band being the E-UTRA operating band 42, iii) the first value being 3420 MHz, and iv) the second value being 3420 MHz, the MSD is 15.3 dB.

2. A user equipment (UE) supporting dual connectivity with Evolved Universal Terrestrial Radio Access (E-UTRA) and New Radio (NR), the UE comprising:

a transceiver configured to transmit uplink signal and receive downlink signal based on the dual connectivity; and a processor configured to control the transceiver, wherein the transceiver is configured to use i) two E-UTRA operating bands from among E-UTRA operating bands 1, 3, 18, 21, 28, 41 and 42, and ii) NR operating band n79, wherein, for a specific operating band, from among the two E-UTRA operating bands and the NR operating band n79, with an uplink center frequency of a first value and with a downlink center frequency of a second value, MSD (Maximum Sensitivity Degradation) is pre-configured, and wherein based on dual uplink operation, the MSD is applied to a reference sensitivity used for reception of the downlink signal, wherein, based on i) the transceiver being configured to use the E-UTRA operating bands 1 and 41, ii) the specific operating band being the E-UTRA operating band 41, iii) the first value being 2530 MHz, and iv) the second value being 2530 MHz, the MSD is 29.4 dB, wherein, based on i) the transceiver being configured to use the E-UTRA operating bands 1 and 42, ii) the specific operating band being the E-UTRA operating band 42, iii) the first value being 3490 MHz, and iv) the second value being 3490 MHz, the MSD is 4.8 dB, wherein, based on i) the transceiver being configured to use the E-UTRA operating bands 1 and 42, ii) the specific operating band being the E-UTRA operating band 1, iii) the first value being 1975 MHz, and iv) the second value being 2165 MHz, the MSD is 15.5 dB, wherein, based on i) the transceiver being configured to use the E-UTRA operating bands 1 and 42, ii) the specific operating band being the E-UTRA operating band 1, iii) the first value being 1950 MHz, and iv) the second value being 2140 MHz, the MSD is 9.3 dB, wherein, based on i) the transceiver being configured to use the E-UTRA operating bands 1 and 18, ii) the specific operating band being the E-UTRA operating band 18, iii) the first value being 820 MHz, and iv) the second value being 865 MHz, the MSD is 8.9 dB, wherein, based on i) the transceiver being configured to use the E-UTRA operating bands 1 and 28, ii) the specific operating band being the E-UTRA operating band 28, iii) the first value being 733 MHz, and iv) the second value being 788 MHz, the MSD is 15.2 dB, wherein, based on i) the transceiver being configured to use the E-UTRA operating bands 1 and 28, ii) the specific operating band being the E-UTRA operating band 28, iii) the first value being 740 MHz, and iv) the second value being 795 MHz, the MSD is 10.0 dB, wherein, based on i) the transceiver being configured to use the E-UTRA operating bands 1 and 28, ii) the specific operating band being the E-UTRA operating band 1, iii) the first value being 1977.5 MHz, and iv) the second value being 2167.5 MHz, the MSD is 1.2 dB, wherein, based on i) the transceiver being configured to use the E-UTRA operating bands 1 and 28, ii) the specific operating band being the E-UTRA operating band 1, iii) the first value being 1935 MHz, and iv) the second value being 2125 MHz, the MSD is 4.5 dB, wherein, based on i) the transceiver being configured to use the E-UTRA operating bands 3 and 28, ii) the specific operating band being the E-UTRA operating band 28, iii) the first value being 725 MHz, and iv) the second value being 780 MHz, the MSD is 10.3 dB, wherein, based on i) the transceiver being configured to use the E-UTRA operating bands 21 and 28, ii) the specific operating band being the E-UTRA operating band 21, iii) the first value being 1450 MHz, and iv) the second value being 1498 MHz, the MSD is 5.2 dB, wherein, based on i) the transceiver being configured to use the E-UTRA operating bands 28 and 42, ii) the specific operating band being the E-UTRA operating band 42, iii) the first value being 3420 MHz, and iv) the second value being 3420 MHz, the MSD is 15.3 dB.

* * * * *